United States Patent [19]

Grimm

[11] Patent Number: 5,120,285
[45] Date of Patent: Jun. 9, 1992

[54] JAM TOLERANT GEARED ROTARY ACTUATOR FOR MULTIPLE ACTUATOR SYSTEMS WITH A SINGLE PRIME MOVER

[75] Inventor: Duane H. Grimm, Rockford, Ill.

[73] Assignee: Sundstrand Corporation, Rockford, Ill.

[21] Appl. No.: 590,927

[22] Filed: Oct. 1, 1990

[51] Int. Cl.⁵ .............................................. F16H 1/28
[52] U.S. Cl. .................................. 475/342; 475/205; 475/225; 475/330
[58] Field of Search ............... 475/204, 205, 221, 225, 475/330, 339, 340, 341, 342

[56] References Cited

U.S. PATENT DOCUMENTS

| | | | |
|---|---|---|---|
| 3,304,804 | 2/1967 | Oldfield et al. | 475/341 X |
| 4,578,993 | 4/1986 | Burandt | 475/900 X |
| 4,688,744 | 8/1987 | Aldrich | 74/661 X |
| 4,721,016 | 1/1988 | Burandt | |
| 4,742,730 | 5/1988 | Dorn et al. | 475/340 |
| 4,825,723 | 5/1989 | Martin | |
| 4,856,379 | 8/1989 | Jafarey | 475/176 |

FOREIGN PATENT DOCUMENTS 27776 11/1909 Sweden .................. 475/342

*Primary Examiner*—Leslie A. Braun
*Assistant Examiner*—Benjamin Levi
*Attorney, Agent, or Firm*—Antonelli, Terry, Stout & Kraus

[57] ABSTRACT

A geared rotary actuator (1) including a compound input stage (3, 5) and a compound output stage (4, 6) with the input stage (3, 5) including a sun gear (24) with gear portions (24a, 24b) respectively meshing with a drive gear (23) and further gear (25). Input/output link members (28, 29) connect the input stage (3, 5) with planet gears (26, 27) of the output stage (4, 6) so as to provide uninterrupted controlled speed, torque and power delivery to an output (31, 32) and through shaft (S) of the geared rotary actuator (1) even upon an occurrence of a jam in the geared rotary actuator (1).

13 Claims, 3 Drawing Sheets

JAM TOLERANT GEARED ROTARY ACTUATOR FOR MULTIPLE ACTUATOR SYSTEMS WITH A SINGLE PRIME MOVER

TECHNICAL FIELD

The present invention relates to a geared rotary actuator (GRA) and, more particularly, to a geared rotary actuator which is adapted to retain full positional authority and torque capacity even if a gear mesh jam occurs.

BACKGROUND ART

GRA's have many applications and, for example, may be employed to drive aircraft flight control surfaces; however, GRA's would be even more extensively used if concerns about potential loss of flight surface control due to gear mesh jams could be alleviated, even though occurrences of such jams are very rare.

In, for example, U.S. Pat. No. 4,856,379, a non-jamming rotary mechanical actuator is proposed which includes at least one moving ring gear having an internal gear surface, with a fixed ring gear on each side of the at least one moving ring gear. Each fixed ring gear is provided with an internal gear surface defining a ring gear bore. A shaft extends through the ring gear, with the shaft including a first cam member rotatable with and secured thereon, and with an axis of the first cam member being offset from an axis of the shaft by a first amount of offset. The ring gears are maintained in a desired relationship by a retaining means which are rotatable with the shaft. Bearing means are mounted within the retaining means for rotatably supporting the shaft, and a generally cylindrical second cam member is provided having a bore extending therethrough. An axis of the bore is offset from an axis of the second cam member by a second amount of offset, with the first cam member being disposed within the bore of the second cam member and having a first amount of offset thereof approximately equal to the second amount of offset. A shear means transmits a torque from the first cam member to the second cam member below a desired torque level. A needle bearing is located around the second cam member, and a compound gear is secured over the needle bearing. The compound gear is provided with a number of gear tooth surfaces thereon, with the number of gear tooth surfaces being equal to a total number of fixed and moving gear rings and in driving relationship therewith below the desired torque level of the shear means.

The above described patented construction senses increased torque in the event of a jam and uses the abnormal torque to shear a drive key to free the input through shaft to continue to drive other actuators in the system, while at the same time disengaging the output stage of the jammed actuator to free the actuator from the control surface. A disadvantage of this approach resides in the fact that a shear key at the input of a high ratio actuator does not offer a very controllable shear setting, and may also be fatigue prone.

A further disadvantage of the above patented construction resides in the fact that the disconnecting of the output also imposes additional loading on adjacent actuators requiring all actuators in the system to be larger and heavier to accommodate potential disconnects of the other actuators.

U.S. Pat. No. 4,721,016 proposes a multiple stage geared rotary actuator having a plurality of balanced compound differentials providing a multiple stage output and for converting a high speed, low torque input to a low speed, high torque output for moving a member such as an aircraft flight control surface.

The last mentioned patented construction offers a means to reduce internal component deflection thus increasing the load capacity but does not provide for a failure mode protection.

In U.S. Pat. No. 4,742,730, a failsafe rotary actuator is proposed having irreversible dual load paths between input and output members in order to achieve a failsafe stiff link with a control surface for retaining the same in position in the event of a single mechanical failure.

While the last mentioned construction protects against an open failure, such construction is not applicable to a gear jamming action.

Another example of a geared rotary actuator is described in, for example, U.S. Pat. No. 4,825,723 wherein multiple ring gears are driven by a set of planet gears and coupled to multiple loads, with two of the ring gears being coupled to a common load through mechanical reaction paths of differing lengths, a shorter of which incorporates a compliant gear member decreasing a stiffness or spring rate of the shorter path to correspond to the stiffness of the spring rate of the longer path.

While the last mentioned patented construction offers an internal spring to balance torque on reaction ring gears, the proposed compound planetary gear assembly does not address failure modes.

Examples of other types of torque responsive overload arrangements are proposed in, for example, U.S. Pat. Nos. 4,365,962, 3,499,511, 3,898,817, 3,968,705, 4,282,776, 4,601,218 and 4,189,960.

Additionally, in commonly assigned United States application Ser. No. 590,929 entitled "Jam Tolerant Geared Rotary Actuator With Automatic Disconnect", filed on even date herewith, an alternative approach or solution for flight control surfaces utilizing a geared rotary actuator is proposed wherein, in the event of a jam, an output torque path of the actuator is automatically disengaged without any loss of position authority or torque capacity of the actuator.

Additionally, commonly assigned co-pending United States application Ser. No. 492,128 proposes a multiple prime mover system that sums inputs from two motors at the output of the actuator to provide torque continuity in the event of a jam, with reduced speed capability provided by the remaining operable motor.

DISCLOSURE OF INVENTION

The aim underlying the present invention essentially resides in providing a jam tolerant geared rotary actuator for multiple actuator for multiple actuator systems with a single prime mover in which, upon an occurrence of a jam, there is no interruption of controlled speed, torque and power delivery to an output of the actuator and through shaft thereof, and, if the jam is a minor jam that happens to clear itself, the actuator automatically resumes a normal mode of operation.

In accordance with advantageous features of the present invention, a gear rotary actuator is provided utilizing a compound input stage that is, in essence, doubly connected to a compound output stage, with the input and output stages cooperating with each other to sum speeds in a manner that automatically compensates for loss of function, i.e., a jam, in any single mesh or row of planetary gears without a loss of speed ratio or torque carrying ability.

Advantageously, according to the present invention, the gear ratios of all the components are selected so that a perfect overall ratio match is provided with adjacent actuators regardless of the mode of operation, that is, a normal or jammed mode, so that there is no tendency to impose any relative twist loads into the element being controlled by the actuator such as, for example, a flight surface of an aircraft.

According to the present invention, a geared rotary actuator is provided wherein means define a compound input stage and additional means define a compound output stage. Means are provided for interconnecting the compound input and compound output stages so as to provide an uninterrupted controlled speed, torque and power delivery from an input to an output of the geared rotary actuator through the input stage and output stage even upon the occurrence of a jam in the geared rotary actuator.

Advantageously, according to the present invention, the compound input stage includes at least one sun gear having a first gear portion and a second gear portion, with a drive gear having a gear portion meshing with the first gear portion of the sun gear, and with a further rotatably mounted fixed with respect to the at least one sun gear and having a gear portion meshing with the second gear portion of the sun gear. The interconnecting means may include a pair of input/output link members respectively coupling the drive gear and further gear with the compound output stage.

The compound output stage may, in accordance with the present invention, include at least two planet gears each having a first and second gear portion. A common output member including first and second interconnected ring gears respectively mesh with the first gear portions of the two planet gears. The pair of link members each include a first gear portion respectively meshing with the drive gear and further gear and a second gear portion respectively meshing with the second gear portion of the at least two planet gears.

The compound input and compound output stages are accommodated in a housing, with a portion of the housing being fashioned as an output member including a gear portion meshing with the second gear portion of the planet gear connected to the driven gear by one of the link members.

The input of the geared rotary actuator of the present invention includes a through shaft connected to a single prime mover and to the drive gear for providing an input to the input stages of the geared rotary actuator.

At least one additional portion of the housing may be fashioned as a reaction member of the geared rotary actuator and include a gear portion meshing with the first gear portion of the planet gear connected to the further gear by one of the input/output link members.

Advantageously, the gear portions of the components of the geared rotary actuator of the present invention are selected so as to provide an input/output ratio of 18:1.

The geared rotary actuator of the present invention is readily adaptable to an aircraft flight control system requiring multiple actuators to control a single hinge line, with a single prime mover being provided for driving the entire actuation system composed of the multiple actuators. For this purpose, the through shaft of the geared rotary actuator of the present invention forms an input for at least one additional geared rotary actuator in the actuation system.

The above and other objects, features and advantages of the present invention will become more apparent from the following description when taken in connection with the accompanying drawings which show, for the purposes of illustration only, several embodiments in accordance with the present invention.

BEST MODE FOR CARRYING OUT THE INVENTION

Figure 1:
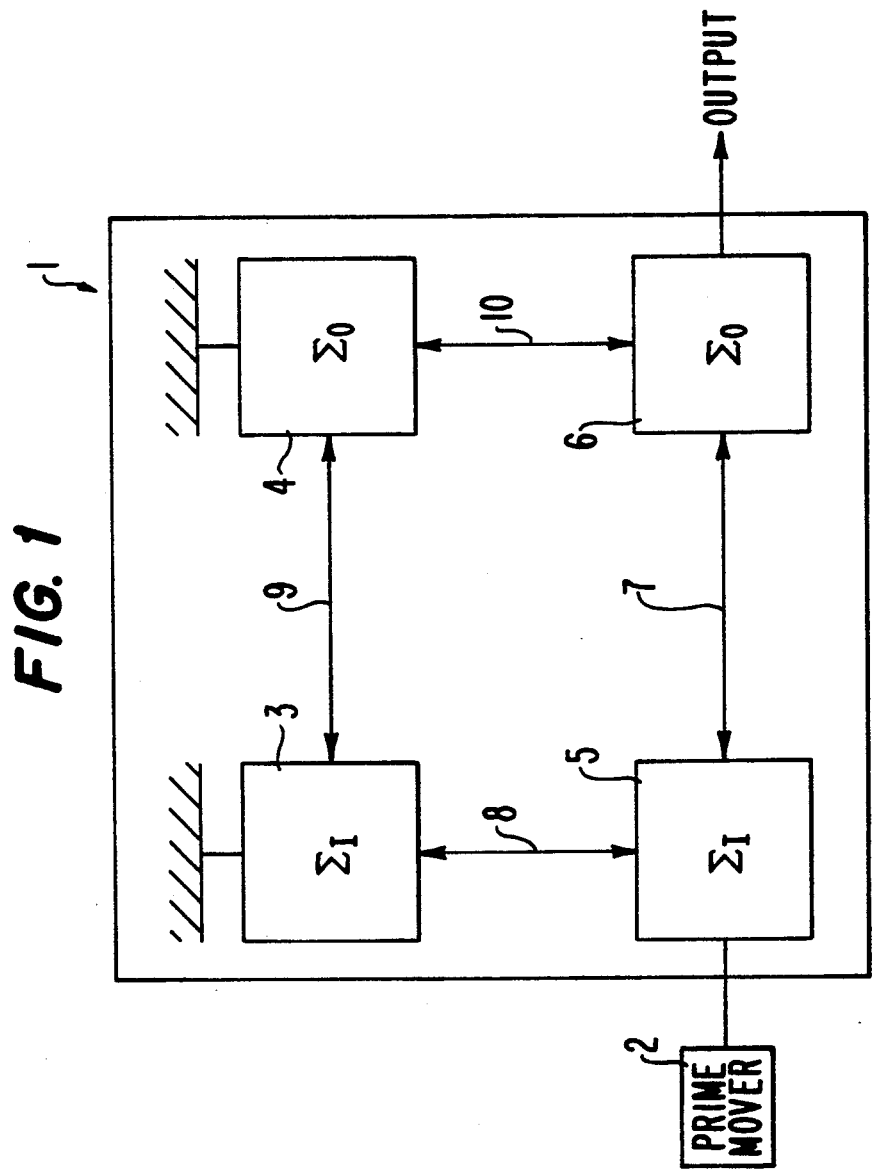
FIG. 1 is a schematic view of a geared rotary actuator constructed in accordance with the present invention.

Referring now to the drawings wherein like reference numerals are used throughout the various views to designate like parts and, more particularly, to FIG. 1, according to this figure, a geared rotary actuator generally designated by the reference numeral 1 constructed in accordance with the present invention includes a plurality of conventional mechanical speed summing differentials 3, 4, 5, 6 interconnected by load path defining means 7, 8, 9, 10, with each summing differential being adapted to receive a speed from two sources, combine the received speed and provide an output in the form of a third speed. Thus, during normal operation, the summing differential 5, for example, receives an input speed from a prime mover 2, such as, for example, a motor, and one of the other summing differentials 3 or 6 through one of the load paths 7 or 8 and provides an appropriate output speed through the other of the load paths 7 or 8.

Figure 2:
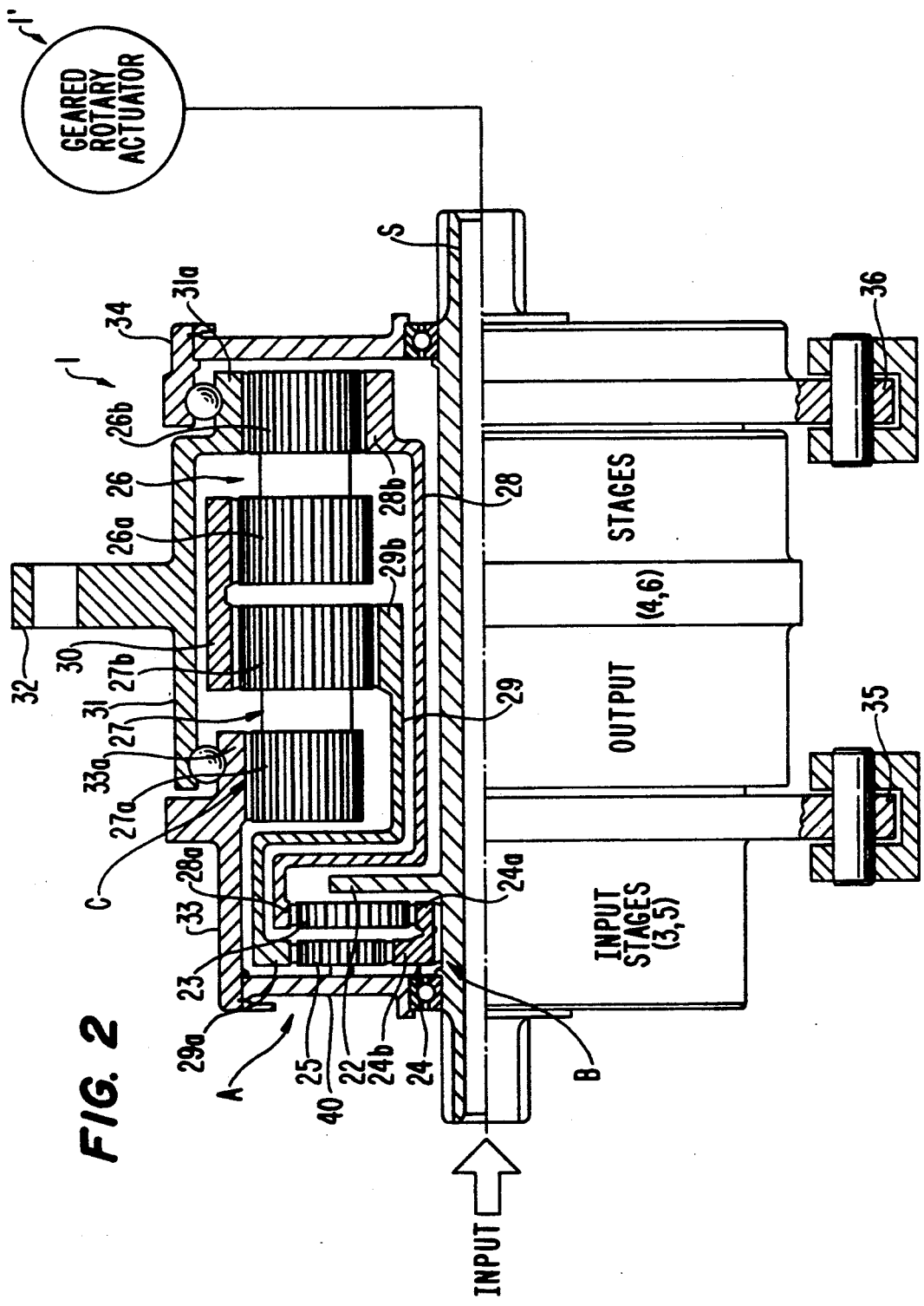
FIG. 2 is a side view, partly in elevation and partly in cross section of a geared rotary actuator constructed in accordance with the present invention.

As shown most clearly in FIG. 2, the input stages 3, 5 of the geared rotary actuator 1 may include an input comprising a through shaft S and a carrier element 22 provided on the through shaft S for rotation therewith. The through shaft S may form an input for at least one additional geared rotary actuator generally designated by the reference numeral 1', as shown in FIG. 2. The carrier element 22 has rotatably mounted thereon an input or drive gear 23 adapted to mesh with an input stage common element generally designated by the reference numeral 24 forming the load path 8 and including a pair of sun gears 24a, 24b respectively meshing with the input or drive gear 23 and a further input gear 25.

The output stages 4, 6 may include a pair of planet gears generally designated by the reference numerals 26, 27, with each planet gear 26, 27 including gear portions 26a, 26b and 27a, 27b. The load paths 7, 9 respectively include input/output interconnect link means 28, 29, with the link means 28 having a gear portion 28a adapted to mesh with the input gear 23 and a second gear portion 28b adapted to mesh with the gear 26b of the planet gear 26. The link means 29 includes a first gear portion 29a adapted to mesh with the input gear 25 and a second gear portion 29b adapted to mesh with the gear portion 27b of the planet gear 27. The load path 10 includes an output common stage element fashioned as ring gears 30 adapted to mesh with gear portions 26a, 27b of the respective planet gears 26, 27.

An output member 31 forming a portion of a housing of the rotary actuator 1 is fashioned as a ring gear including a gear portion 31a adapted to mesh with the gear portion 26b of the planet gear 26. The output member 31 includes an output arm 32 connected, in a conventional manner, with, for example, a flight control surface of an aircraft. Reaction members 33, 34 also form a portion of the housing of the rotary actuator 1, with the reaction members 33, 34 respectively including reaction arms 35, 36 adapted to be connected, in a conventional manner, with an aircraft frame member. The reaction members 33, 34 are thus fixed or grounded members of the geared actuator 1, and the reaction member 33 includes a gear portion 33a adapted to mesh with gear portion 27a of the planet gear 27.

It is important to select the gear ratios between the respective components of the rotary actuator 1 so that a perfect overall ratio match is provided with adjacent rotary actuators 1 in a multi-actuator system regardless of the mode of operation of the actuator, that is, a jammed or normal mode of operation, so that there is no tendency to impose relative twist loads into the member or members being controlled such as, for example, flight control surfaces of an aircraft. While any desired ratio between the respective components could be provided in other combinations of doubly connected planetary gear sets other than the gear sets described hereinabove and would provide similar characteristics, for the purpose of illustration only, the description hereinbelow provides an example wherein the actual number of gear teeth of the respective gear sets achieve an 18:1 overall ratio.

For this purpose, to achieve and 18:1 overall gear ratio, the drive gear 25 and gear portions 26a, 26b, 27a, 27b of the planet gears 26, 27 each have thirteen (13) gear teeth, with the gear portion 31a of the output member 31 and gear portion 33a of the reaction member 33 having fifty-two (52) teeth, and with the sun gears 24a, 24b respectively being provided with fifteen (15) and eighteen (18) teeth. The gear portion 29a of the link 29 is provided with forty-five (45) teeth, with the gear portion 29b including twenty (20) teeth. The gear portion 28a of the link 28 is provided with forty-five (45) teeth and the gear portion 28b includes twenty-six (26) teeth. The ring gears of common output member 30 are each provided with forty-six (46) teeth.

Figure 3:
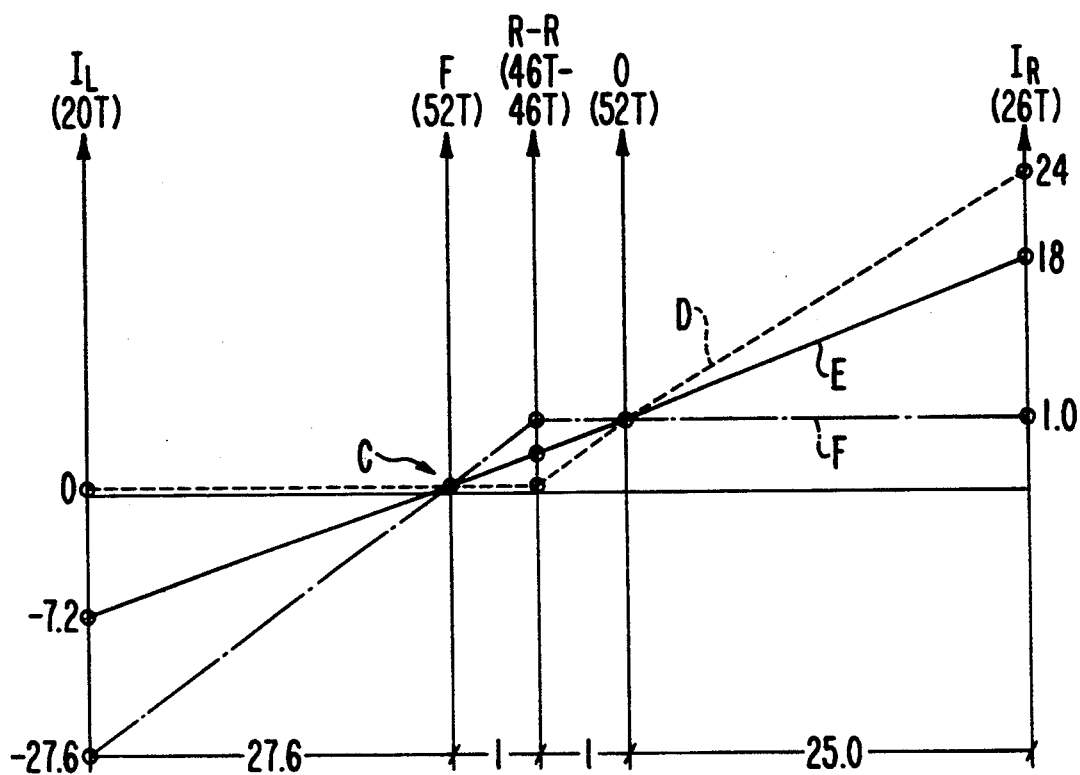
FIG. 3 is an output nomograph of the geared rotary actuator of the present invention.
Figure 4:
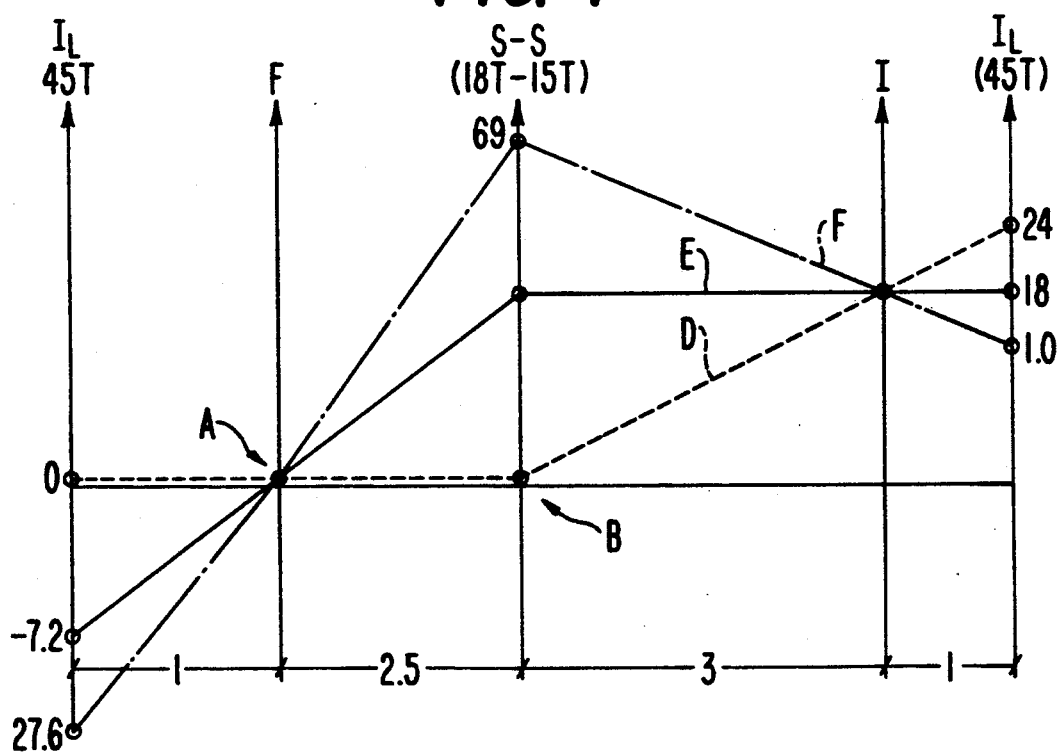
FIG. 4 is an input nomograph of the geared rotary actuator constructed in accordance with the present invention.

The nomographs of FIGS. 3 and 4 provide a graphical illustration of the relationship between the respective components of the general rotary actuator 1 of the present invention with the above noted gear ratios. The abscissa of FIGS. 3 and 4 represents the nomograph spacing, with the ordinate representing the component speed; however nomographs of FIGS. 3 and 4 are not to scale but merely illustrate the relationship obtainable with the jam tolerant geared rotary actuator 1 constructed in accordance with the present invention. One advantageous characteristic of nomographs is that any straight line across the nomograph is valid representation of speed. Thus, the nomographs spacing is a function of how one selects the number of gear teeth. Consequently, the above referenced number of gear teeth for the components of the geared rotary actuator 1 of the present invention can be resolved into the depicted nomographs of FIGS. 3 and 4 with the noted spacing between the respective elements of the nomograph.

In FIG. 3, the designations $I_L$, F, R—R, O and $I_R$ respectively represent the input left or gear portion 29b, the fixed elements or reaction members 33, 34, the common output element or ring gears 30, the output member or ring gear portion 31a of the output member 31 and input right or gear portion 28b of the link 28. In FIG. 4, the designations $I_L$, F, S—S, I and $I_R$ respectively represent the input left or gear portion 29a, the grounded input or input gear 25 fixed to the end plate or cover 40 of the housing of the geared rotary actuator 1, the sun gears 24a, 23b, the input element or through shaft S and carrier 22 and input right or gear portion 28a.

In FIGS. 3 and 4, the solid lines E represent the normal operation of the geared rotary actuator 1 of the present invention, with the dashed lines D representing the input and output stages with a jam occurring at a left hand portion of the geared rotary actuator 1, as viewed in FIG. 2, and the chain lines F representing the input and output stages with a jam occurring at the right hand portion of the geared rotary actuator 1.

With the geared rotary actuator 1 of the present invention installed in, for example, an aircraft for controlling a position of flight control surfaces, two points A, B of the geared rotary actuator 1 are fixed, namely, the reaction member 33, 34 by virtue of the mounting of the actuator to a fixed structure such as, for example, an aircraft frame member, and the input gear 25 by virtue of the rotatable support thereof by the fixed end cover 40. Thus, the positions A, B represent anchor points for the geared rotary actuator 1. With these elements fixed, in a normal operation of the geared rotary actuator 1, upon a rotation of the input from the prime mover 2 at, for example, 18 rpm, an output of 1 rpm is provided as shown by the solid line E in FIGS. 3 and 4.

However, if the jam occurs, for example, at the point B, that is at the sun gear 24, the only response of the geared rotary actuator 1 would be to increase the speed of the right hand input, that is, the gear portion 28a meshing with the gear member 23. By virtue of the input/output interconnect link means 28 between the gear portion 28a and gear portion 28b, the speed is automatically transferred through the gear portion 28b and 26b of the planet gear 26 which, in turn, automatically increases the rpm to, for example, 24 rpm as shown by the dashed line D in FIGS. 3 and 4. However, since the sun gear 24 is jammed, the common output member or ring gears 30 are also grounded. By virtue of the above noted selection of the gear ratios, as shown in FIGS. 3 and 4, with the above noted jam occurring, an output of one (1) rpm is provided with the 18:1 selected ratio.

By consideration of the relationships illustrated in FIGS. 3 and 4, it is possible to readily determine the component speeds for normal and jammed operation relative to the output speed of 1 rpm and an input speed of 18 rpm, with the left and right side of the nomographs depicting corresponding speeds of the right and left planetary elements in the input and output stages 3-6 of the geared rotary actuator 1.

The distinct advantages of the present invention are achieved by utilization of the compound input stage and the double connection to the compound output stage. More particularly, with a doubly connected arrangement, an input is connected to the output but also connected to the other input which is, in turn, connected to the output so that there is an open flow path for torque and power between the input and output whereby, if one flow path locks up there is always an alternative flow path so that the geared rotary actuator 1 on the present invention provides for a double flow path. Consequently, to an observer, a geared rotary actuator is provided which will always, regardless of the condition of the gear system of the actuator, provide a given input and a given output, for example, 18 rpm as an input and 1 rpm as an output. This double flow path feature of the geared rotary actuator 1 of the present invention is extremely beneficial and important when the geared rotary actuator 1 is utilized to position flight control surfaces of an aircraft. If, for example, a pilot is attempting to attempt a landing and at a point in time of the landing approach a jam occurs in the rotary actuator 1 without sufficient time to determine the existence or cause of the jam or take any corrective action. By virtue of the features of the geared rotary actuator 1 of the present invention, an output is nevertheless provided thereby enabling the necessary correction or repositioning of the control surfaces to enable a safe completion of the landing.

With the jam tolerant geared rotary actuator 1 of the present invention, no shear or disconnect action is required to provide for the jam tolerance and transition from the normal to jammed operation is automatic and requires no other control means to initiate the compensating action. If the jam occurring in the geared rotary actuator 1 is minor and such a jam should happen to clear itself, the geared rotary actuator 1 of the present invention automatically resumes a normal mode of operation.

It is also possible in accordance with the present invention to provide for a detection of passive failures by utilizing a detent/indicator device (not shown) located in the right hand input planetary gear arrangement whereby any relative rotation of the elements at that stage would be an indication of a possible jam.

While a geared rotary actuator 1 of the present invention has been described hereinabove as utilizing spur gears, as can readily be appreciated, other types of gearing such as, for example, helical, or even bevel gears, may be employed in similar arrangements in order to achieve the desired jam tolerance.

While I have shown and described only one embodiment in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. A geared rotary actuator comprising:
    means defining a compound input stage of the geared rotary actuator including at least one sun gear having a first gear portion and a second gear portion, a drive gear having a gear portion meshing with said first gear portion of said sun gear, and a further rotatably mounted gear fixed with respect to said sun gear and having a gear portion meshing with said second gear portion of said sun gear;
    means defining a compound output stage of the geared rotary actuator; and
    means interconnecting the compound input and compound output stages so as to provide uninterrupted controlled speed, torque and power delivery from an input to an output of the geared rotary actuator through said input stage and said output stage even upon an occurrence of a jam in the geared rotary actuator, said means interconnecting including a pair of input/output link members respectively coupling the drive gear and further gear with the compound output stage.

2. A geared rotary actuator according to claim 1, wherein said compound output stage includes at least two planet gears each having a first and second gear portion, a common output member including first and second ring gears respectively meshing with the first gear portion of one of said planet gears, and with the second gear portion of the other of said two planet gears, and wherein the pair of link members each include a first gear portion respectively meshing with said drive gear and said further gear and a second gear portion respectively meshing with said first gear portions of said at least two planet gears.

3. A geared rotary actuator according to claim 2, further comprising a housing accommodating the compound input and compound output stages, and wherein a portion of said housing is fashioned as an output member including a gear portion meshing with the first gear portion of said one planet gear connected to said drive gear by one of said link members.

4. A geared rotary actuator according to claim 3, wherein another portion of said housing is fashioned as a reaction member of the geared rotary actuator and includes a gear portion meshing with the first gear portion of the planet gear connected to said further gear by the other of the link members.

5. A geared rotary actuator according to claim 4, wherein the input includes a through shaft connected to a single prime mover and to said drive gear for providing an input to the input stages of the geared rotary actuator.

6. A geared rotary actuator according to claim 5, wherein the gear portions are selected so as to provide an input/output ratio of 18:1.

7. A geared rotary actuator according to claim 6, wherein the portion of said housing forming an output member includes an output arm adapted to be connected to a control means.

8. A geared rotary actuator according to claim 7, wherein the control means includes flight control surfaces of an aircraft.

9. A geared rotary actuator according to claim 8, wherein the through shaft forms an input for at least one additional geared rotary actuator.

10. A geared rotary actuator according to claim 1, wherein the geared rotary actuator has an input/output ratio of 18:1.

11. A geared rotary actuator according to claim 1, wherein the input includes a through shaft connected to a prime mover and the compound input stage.

12. A geared rotary actuator according to claim 11, wherein the through shaft forms an input for at least one additional geared rotary actuator.

13. A geared rotary actuator comprising:
    means defining a compound input stage of the geared rotary actuator;
    means defining a compound output stage of the geared rotary actuator including at least two planet gears each having a first and second gear portion, a common output member including first and second ring gears respectively meshing with the first gear portion of one of said two planet gears and with the second gear portion of the other of said two planet gears; and means interconnecting the compound input and compound output stages so as to provide uninterrupted controlled speed, torque and power delivery from an input to an output of the geared rotary actuator through said input to an output of the geared rotary actuator through said input stage and said output stage even upon an occurrence of a jam in the geared rotary actuator, said means interconnecting including a pair of link members arranged between the compound input stage and the first gear portions of the respective planet gears.

* * * * *

UNITED STATES PATENT AND TRADEMARK OFFICE
CERTIFICATE OF CORRECTION

PATENT NO.   :   5,120,285
DATED        :   April 7, 1992
INVENTOR(S)  :   Jacob N. Gust It is certified that error appears in the above-identified patent and that said Letters Patent is hereby corrected as shown below:

Column 7, line 23, claim 14, delete "p1" after the word "bin;".

Column 7, line 23, claim 14, "bin" should be a new paragraph (bin discharge...).

Signed and Sealed this

Tenth Day of August, 1993

Attest:

MICHAEL K. KIRK

Attesting Officer     Acting Commissioner of Patents and Trademarks